United States Patent
Garrett et al.

[19]

[11] Patent Number: 6,117,375
[45] Date of Patent: Sep. 12, 2000

[54] ROOFING MEMBERS WITHOUT AUXILIARY FACERS AND RELATED METHODS

[75] Inventors: Allen M. Garrett, Noblesville; John B. Letts, Carmel, both of Ind.

[73] Assignee: Bridgestone/Firestone, Inc., Akron, Ohio

[21] Appl. No.: 09/053,347

[22] Filed: Apr. 1, 1998

Related U.S. Application Data

[62] Division of application No. 08/700,340, Sep. 23, 1996, abandoned.

[51] Int. Cl.[7] .............................. B29C 44/20; B29C 44/02
[52] U.S. Cl. ..................... 264/46.2; 156/247; 264/45.8; 264/145
[58] Field of Search ................... 264/46.2, 45.8, 264/145; 156/247

[56] References Cited

U.S. PATENT DOCUMENTS

| | | | |
|---|---|---|---|
| 3,512,819 | 5/1970 | Morgan et al. | 278/189.36 |
| 3,657,036 | 4/1972 | Mullenhoff et al. | 156/79 |
| 3,738,895 | 6/1973 | Paymal | 264/46.2 |
| 3,842,559 | 10/1974 | Payne | 52/309 |
| 3,959,049 | 5/1976 | Tanaka et al. | 156/79 |
| 4,037,006 | 7/1977 | Roberts et al. | 428/71 |
| 4,052,831 | 10/1977 | Roberts et al. | 52/309 |
| 4,094,869 | 6/1978 | Biranowski et al. | 260/2.5 AW |
| 4,205,136 | 5/1980 | Ohashi et al. | 521/118 |
| 4,255,105 | 3/1981 | Hoffmann et al. | 264/46.2 |
| 4,357,384 | 11/1982 | Jasperson | 428/215 |
| 4,388,366 | 6/1983 | Rosato et al. | 428/285 |
| 4,410,641 | 10/1983 | Narayan et al. | 521/167 |
| 4,449,336 | 5/1984 | Kelly | 52/105 |
| 4,572,865 | 2/1986 | Gluck et al. | 264/46.2 |
| 4,599,258 | 7/1986 | Hageman | 428/140 |
| 4,645,710 | 2/1987 | Baitinger et al. | 428/317.7 |
| 4,756,860 | 7/1988 | Hooper et al. | 264/45.8 |
| 4,938,819 | 7/1990 | Ishii et al. | 156/78 |
| 4,944,818 | 7/1990 | Dybsky et al. | 156/71 |
| 4,965,977 | 10/1990 | White | 52/410 |
| 5,001,005 | 3/1991 | Blanpied | 428/283 |
| 5,081,810 | 1/1992 | Emmert | 52/221 |
| 5,084,485 | 1/1992 | Heilig et al. | 521/125 |
| 5,102,728 | 4/1992 | Gay et al. | 428/26 B |
| 5,112,678 | 5/1992 | Gay et al. | 428/26 B |
| 5,192,598 | 3/1993 | Forte et al. | 428/71 |
| 5,219,629 | 6/1993 | Sobolev | 428/35.9 |
| 5,220,762 | 6/1993 | Lehnert et al. | 52/408 |
| 5,254,301 | 10/1993 | Sessions et al. | 264/46.2 |
| 5,817,260 | 10/1998 | Lynn et al. | 264/46.2 |

FOREIGN PATENT DOCUMENTS

| | | |
|---|---|---|
| 0 011 753 | 9/1979 | European Pat. Off. . |
| 2691196 | 11/1993 | France . |
| 32 41 520 | 5/1984 | Germany ................. 264/46.2 |
| 1327533 | 8/1973 | United Kingdom . |
| WO 81/01816 | 7/1981 | WIPO . |

*Primary Examiner*—Allan R. Kuhns
*Attorney, Agent, or Firm*—David G. Burleson; Daniel N. Hall; Arthur M. Reginelli

[57] ABSTRACT

An insulation board (10) insulation board comprising a foam core (11) selected from the group consisting of polyisocyanurate and polyurethane materials and mixtures thereof; the board being devoid of facers. A method of covering roofs comprises applying insulation boards to a roof deck, the insulation boards comprising a foam core selected from the group consisting of polyisocyanurate and polyurethane materials and mixtures thereof, the boards being devoid of facers; and, applying a weather protective layer over the insulation boards. A continuous method of making a facerless insulation board comprising the steps of feeding a first sheet (24) of temporary facer material into a laminator (25); depositing a foamable polymer liquid (40) onto the first sheet; feeding a second sheet (23) of temporary facer material into the laminator above the foamable polymer liquid; allowing the polymer liquid to rise between the first and second sheets forming polymer foam (44) of a predetermined thickness; curing the polymer foam under heat (45) to create the insulation board; removing the first and second sheets from the board prior to final curing and cooling; and cutting the board to desired lengths.

8 Claims, 3 Drawing Sheets

ROOFING MEMBERS WITHOUT AUXILIARY FACERS AND RELATED METHODS

This application is a divisional of U.S. Ser. No. 08/700,340 filed on Sep. 23, 1996, now abandoned.

TECHNICAL FIELD

This invention relates to a polyisocyanurate board suitable for use as an insulation board for covering commercial roofs. More particularly, the present invention relates to a polyisocyanurate board made without facers. The invention also provides a method for the manufacture of facerless insulation boards as well as a method for covering roofs with such boards.

BACKGROUND OF THE INVENTION

Roof construction in a built-up flat or low-pitched roof generally consists of a roof deck, an insulation barrier above the deck, a weather resistant layer applied to the insulation layer, and optionally a layer of heat resistant material. The roof deck generally includes materials such as wood, gypsum, concrete, steel, and the like. The roof deck can refer to the existing roof, including the existing insulation and weather resistant layer. Above the roof deck, insulation boards are typically applied to provide thermal insulation and a uniform surface to which the weather protective layer is applied. The most common insulation boards are made of polyisocyanurate boards faced with cellulosic facers reinforced with fiberglass. The facers are typically bonded to both major surface areas of the board. Other facers which may be employed include those that are either rigid or flexible and are optionally fire or flame-retardant. Insulation boards can be used in new roof applications as well as reroofing operations.

Recovery boards, as they are referred to in reroofing, have been employed where the existing roof is leaking. These boards are generally applied to a built-up roof deck to provide a uniform surface when recovering an existing roof. To seal the roof from the elements, the insulation or recovery boards are typically covered with various materials including molten asphalt, modified bitumen membrane, rubberized asphalt, or an elastomeric composition such as EPDM (ethylenepropylene diene monomer). The heat resistant layer of material, which is generally applied directly to the weather resistant layer, can include gravel, river stone, foam or a layer of mastic followed by granules.

Application of the weather protective layer can be accomplished by a number of means, usually dictated by the type of material employed. For example, sheets of a protective membrane can be rolled out over the roof and bonded together by torching or the use of an adhesive.

The patent literature does include panels and boards used for roofing operations. Built-up roof constructions and the components thereof, for example, are well-known in the art as generally explained in Forte et al, U.S. Pat. No. 5,129,598, Blanpied, U.S. Pat. No. 5,001,005, Dybsky et al., U.S. Pat. No. 4,944,818, and Rosato et al., U.S. Pat. No. 4,388,366. With regard to insulation boards, Forte et al is directed toward composite sheathing boards which provide effective thermal insulation while remaining permeable to the transmission of water vapor. The boards comprise a polymer foam core, including polyisocyanurate, polyurethane, polystyrene and the like, and optionally at least one facer. While the patent discloses that facers may not be required, if the manufacturing process does not demand their use, they are nevertheless preferred.

Blanpied teaches a rigid foam board comprising a thermosetting plastic foam sandwiched between two facers; the facer comprising glass fibers, non-glass filler, and non-asphaltic binder. Likewise, Dybsky et al. teaches a composite roofing substrate panel comprising a core of combustible material such as fibers or foams and a facer of noncombustible material such as glass fibers coated with a bituminous material. Rosato et al. teaches a laminate insulation board comprising a plastic foam core and at least one facer sheet forming both a protective layer and a venting means for fluids; the facer sheet comprising fine glass fibers bonded together with polyvinyl acetate.

Although the above described insulation boards teach the use of at least one facer, the addition of facers to polyisocyanurate foam boards adds cost. Furthermore, the facers heretofore employed are typically not water resistant. Thus, the elimination of the facers would both lower production costs and improve the moisture resistance of the boards.

In some applications, such as when ballasted EPDM is employed, facers may not be required. Nonetheless, present manufacturing practice requires a barrier between the laminator slats and the foam to prevent the foam from sticking to the slats. Furthermore, even if boards could be produced in the laminator without employing facers, a further problem that would be encountered is that the bundles would stick together, especially as the internal temperature of the bundles increases. Thus, facers are further required to separate the boards during storage and transportation.

Accordingly, a need exists for an insulation board which can be manufactured without facers. Moreover, such boards must be dimensionally stable and not warp or bow when wet.

SUMMARY OF INVENTION

It is therefore, an object of the present invention to provide a relatively inexpensive insulation board, particularly for use in covering roofs, that is dimensionally stable in hot, humid and wet conditions.

It is another object of the present invention to provide an insulation board without facers that can withstand application of the weather protective layer over it and onto the roof.

It is another object of the present invention to provide a facerless insulation board having sufficient integrity to patch or cover the roof.

It is yet another object of the present invention to provide a facerless insulation board that is less expensive than existing insulation boards having facers.

It is still another object of the present invention to provide a facerless insulation board that has greater resistance to moisture attack than existing insulation boards having facers.

It is another object of the present invention to provide a facerless insulation board providing a good base for subsequent application of the final layer or roof covering and, which is compatible with the latter and the respective means of application.

It is yet another object of the present invention to provide a method for covering roofs utilizing a facerless insulation board according to the present invention.

It is still another object to provide a method for manufacturing a facerless insulation board of the present invention.

At least one or more of the foregoing objects of the present invention together with the advantages thereof over the existing insulation boards having facers, which shall become apparent from the specification that follows, are accomplished by the invention as hereinafter described and claimed.

In general the present invention provides an insulation board comprising a foam core selected from the group consisting of polyisocyanurate and polyurethane materials and mixtures thereof; the board being devoid of facers.

The present invention also includes a method of covering roofs comprising applying insulation boards to a roof deck, the insulation boards comprising a foam core selected from the group consisting of polyisocyanurate and polyurethane materials and mixtures thereof, the boards being devoid of facers; and, applying a weather protective layer over the insulation boards.

The present invention further provides a continuous method of making a facerless insulation board comprising the steps of feeding a first sheet of temporary facer material into a laminator; depositing a foamable polymer liquid onto the first sheet; feeding a second sheet of temporary facer material into the laminator above the foamable polymer liquid; allowing the polymer liquid to rise between the first and second sheets forming polymer foam of a predetermined thickness; curing the polymer foam under heat to create the insulation board; removing the first and second sheets from the board prior to final curing and cooling; and cutting the board to desired lengths.

Finally, the invention provides a continuous method of making a facerless insulation board comprising the steps of depositing a foamable polymer liquid onto a first coated conveyor belt; allowing the polymer liquid to rise between and contact a second coated conveyor belt that is positioned at a predetermined distance above the first coated conveyor belt to form a polymer foam mass at a predetermined thickness; curing the polymer foam mass under heat to create an insulation board; removing the insulation board from the conveyor belt; and cutting the board to desired lengths.

PREFERRED EMBODIMENT FOR CARRYING OUT THE INVENTION

The present invention is directed toward a facerless insulation board or roofing member that is used in the roofing of buildings as well as in reroofing of an existing roof. The roofing member is applied to a roof deck which is substantially flat or low-pitched, and which can be newly constructed, or which is exposed by the removal of old roofing or, which is an existing built-up roof in suitable condition for recovering. Inasmuch as roof decks are known and do not constitute part of the present invention, other than as a substrate or base upon which the roofing members are laid, further detail is not necessary. Although the roofing members are specifically designed for new roof installations, the boards can also be utilized as part of reroofing operations.

One common problem in most if not all reroof installations is a wet and often somewhat deteriorated roof or substrate. Typically, when a leak is noticed, and certainly when it is deemed necessary to repair, use of the insulation board of the present invention provides an inexpensive and facile means of reroofing either the affected area or more commonly, the entire roof. Thus, the roofing member must have sufficient integrity to patch or cover the roof; it must provide a good base for subsequent application of the final layer or covering, such as an EPDM roofing membrane; and, it must be compatible with the latter and the respective means of application.

In other words, a board placed over the old roof to act as a substrate for the new waterproof membrane will typically become wet. Existing boards made from wood fiber, extruded polystyrene will distort and/or deteriorate, necessitating further reroofing efforts. Existing boards manufactured from isocyanurate foams would fare far better, except the existing state of the art has been to utilize facers that can absorb moisture, leading to the distortion of the board. While such problems can be minimized by drying the roof before repair, or by waiting for it to dry, this is not often practical.

Other facer materials have employed glass and fiberglass reinforcement, which is typically bonded together with a urea/formaldehyde resin; however, these "all glass" facers as they are sometimes referred, are notorious for a condition known as "strike through" during the manufacturing process. When this occurs, the foam can more readily penetrate through the facer and reach the lamination equipment, causing it to freeze up as well as creating other manufacturing problems. This weakness has been somewhat attributed to the industries' usage of polymers as bonding agents that are porous to permit venting of gases and vapors. Polyvinyl acetate, for example, can be utilized as the bonding agent to provide such porosity in facers reinforced with glass. Accordingly, the insulation boards of the present invention do not suffer from these inherent problems because they are devoid of facers.

Figure 1:
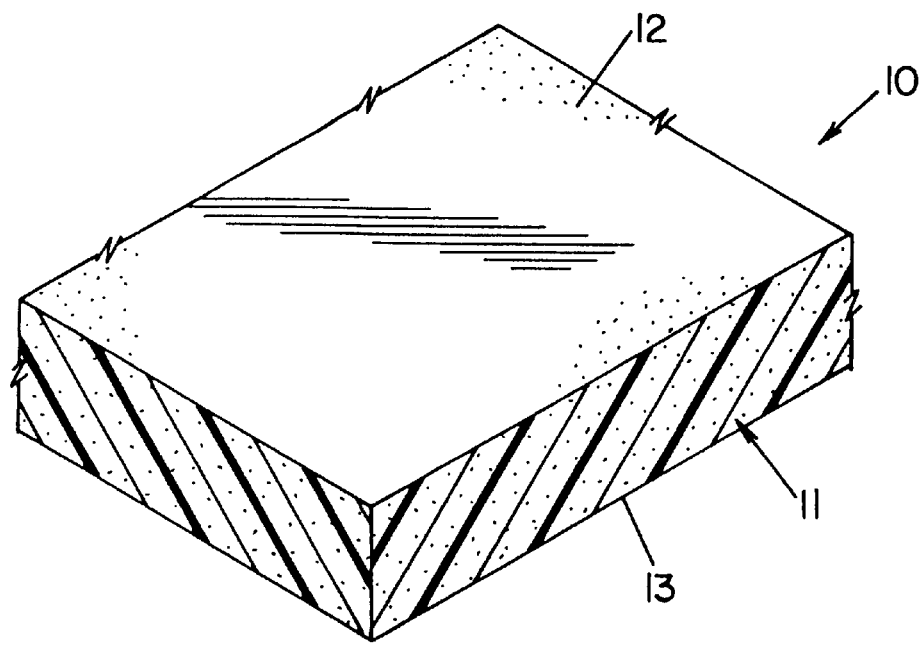
FIG. 1 is a perspective view of an insulation board in accordance with the present invention.

With reference to FIG. 1, an insulation board according to the present invention is indicated generally by the numeral 10 and comprises a foam core 11 having upper and lower surfaces, 12 and 13, respectively. The boards 10 are generally from about 0.5 to about 4 inch thick, and can be fabricated in various dimensions depending on the intended application. Boards fabricated into sheets 4 feet wide and 8 feet long are best suited for compatibility in the building trade.

The foam core 11 can be polyisocyanurate, polyurethane, or mixtures thereof. The foam core is generally of standard production and generally includes those having an index of about 250. Particularly, when polyisocyanurate foam is employed, those having an index above 200 are preferred; and when urethane is employed, an index above 120 is preferred. Further, mixed foams can be employed, such as a mixture of polyisocyanurate and urethane.

The insulation boards 10 are typically applied to the roof deck in staggered parallel adjacent courses that abut one another. Once the insulation board of the present invention has been applied to a roof deck, the roof is completed by covering the substrate with a weather protective layer. The protective layer can include asphalt, bitumen, modified bitumen, rubberized asphalt, EPDM roofing membranes or any other conventional protective layer known in the art. In ballasted roofs, this protective layer is then covered with gravel or river stone; wherein the weight of the river stone serves a second function which is to secure the protective layer and underlying materials, such as the insulation boards, to the roof deck. Thus, the product of this invention has special utility in EPDM ballasted roof systems because of its cost effectiveness and resistance to moisture.

Figure 2:
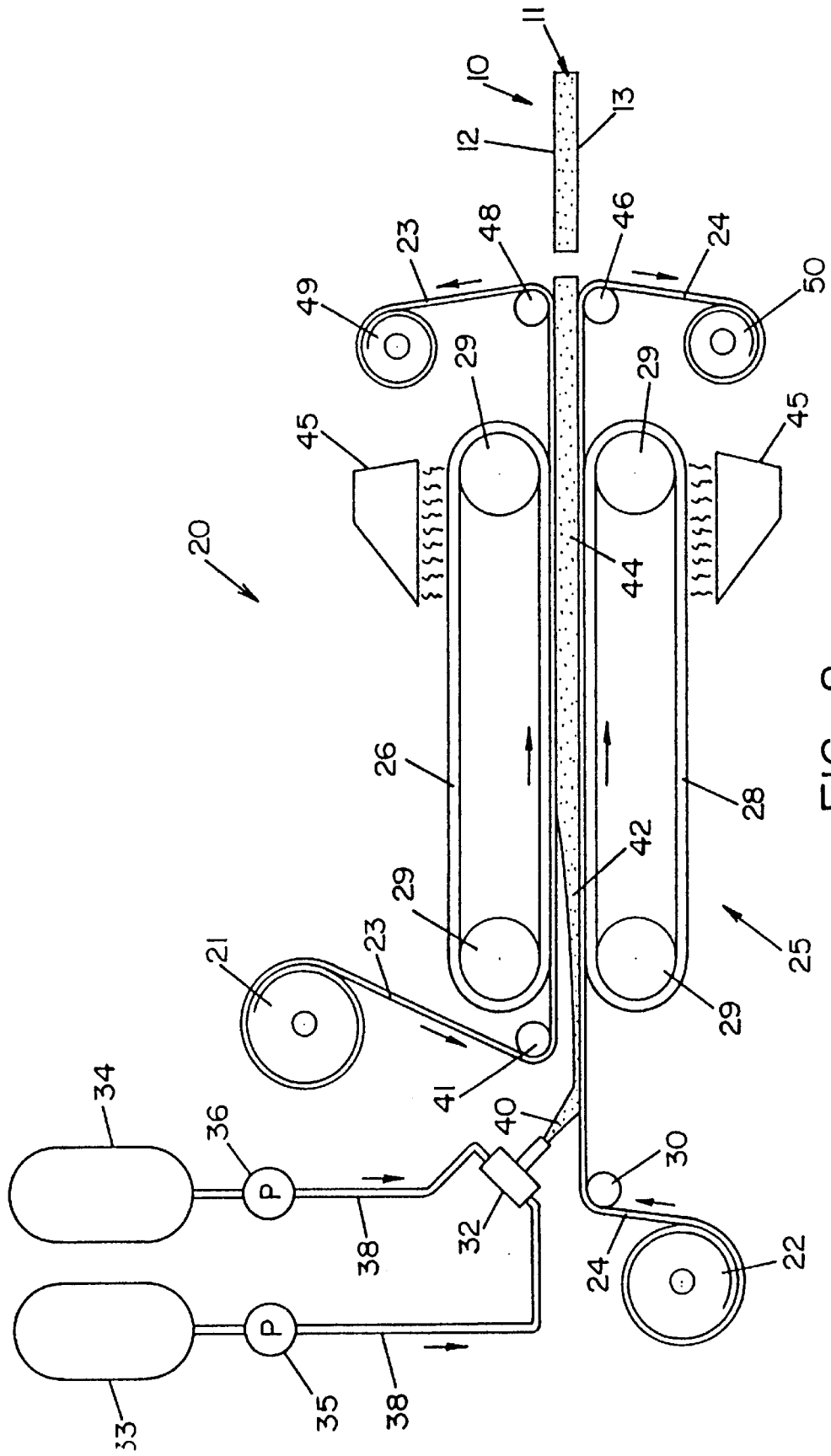
FIG. 2 is a schematic view of apparatus employed to manufacture insulation board of the present invention.

While the boards may be manufactured in a batch process, a continuous, on-line process is preferred as such a process is both efficient and economical. With reference to FIG. 2, a continuous process is schematically depicted in conjunction with apparatus 20. The apparatus provides upper and lower spools, 21 and 22 respectively, for upper and lower sheets of temporary facer materials 23 and 24, which are positioned for feeding into a laminator assembly, generally 25, which comprises upper and lower continuous belts or treads, 26 and 28, reeved around a series of rolls 29, several of which are driven. The lower or bottom sheet 24, is first fed over a roller 30 and into the laminator 25, resting on belt 28.

Upper and lower sheets 23 and 24 comprise a highly flexible polymeric material, such as a polyolefin film. Other films of the appropriate thickness that could be used include poly(tetrafluoroethylene) (Teflon®), poly(vinylfluoride), poly(trifluoroethylene), poly(vinylidene fluoride), and poly (dimethylsiloxane). A suitable polyolefin is high density polyethylene (HDPE), having a thickness in the range from about 0.6 mil to about 200 mil, and preferably in the range from about 0.75 to about 100. While other films can be employed, their selection is based upon use of a flexible material that will not interact, bond or otherwise adhere to the foam material at any stage during the manufacturing process. Thus, it is within the skill of the art to select alternative materials for upper and lower sheets 23 and 24, without departing from the scope of this invention.

Immediately above the sheet 24, as it enters the laminator 25, is a foam mixhead 32. The mixhead 32 is fed from reservoirs 33 and 34, or whatever number are required to produce the polymer foam composition selected. Where the desired foam is a polyurethane, for instance, reservoir 33 can provide the isocyanate components and reservoir 34 the polyol components. The resin materials from these reservoirs are fed through metering pumps 35 and 36 and through appropriate conduits 38 into the mixhead 32, where upon contact, reaction commences to form the polymer foam.

The mixhead 32 then supplies an appropriate mixture 40 of resins from the reservoirs 33 and 34, as well as an appropriately metered amount, onto the surface of the moving sheet 24. Subsequently, and slightly downstream of the mixhead 32, the upper sheet 23 is fed into the laminator 25, passing around a feed roller 41, which positions the sheet 23 against the upper belt 26. As the sheets and deposited foamable composition are conveyed, the latter rises, as depicted at 42, until the upper sheet 23 is in complete contact with the upper belt 26. It is to be appreciated that the belts 26 and 28 are adjustable to accommodate the desired thicknesses of board 10.

After the foaming has completed, the intermediate product, indicated by the numeral 44, is heated to effect curing of the polymer. This is accomplished by appropriately located heaters, generally 45, or by passage through an oven (not shown). After heating for the appropriate time (residence) and temperature, the product emerges from the laminator 25 and the upper and lower sheets of temporary facer materials, 23 and 24, are peeled away from the foam core 11, passing over respective guide rolls 46 and 48, to be taken up by rolls 49 and 50. The taken up sheets of material can be recycled to rolls 21 and 22 for subsequent runs through the apparatus 20.

Figure 3:
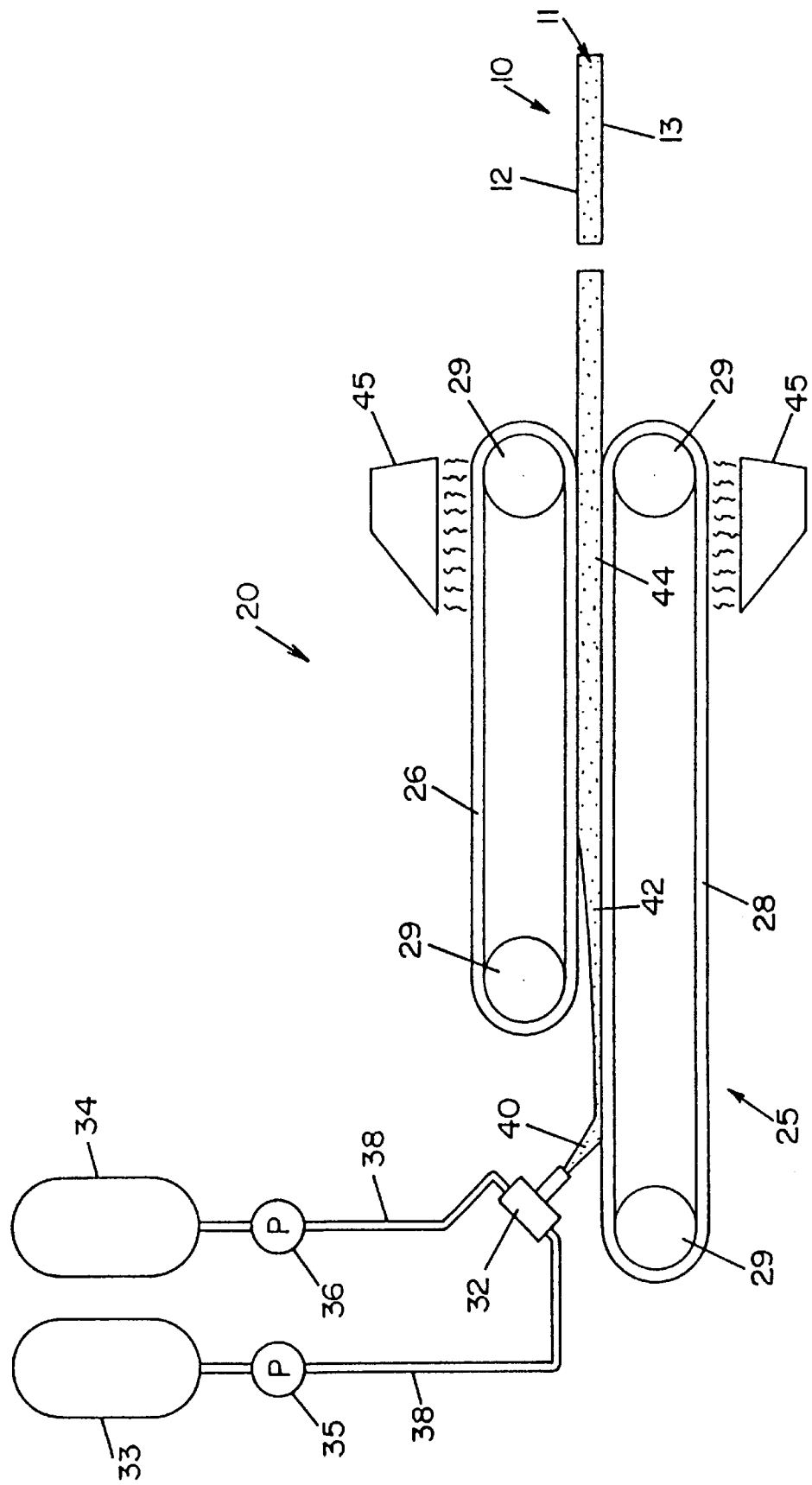
FIG. 3 is a schematic view of an alternative apparatus employed to manufacture insulation board of the present invention.

Alternatively, the conveyor belts 26 and 28 can be coated with a material that does not adhere to foam. Such material generally includes those selected from the group consisting of Teflon®, poly(vinylfluoride), poly(trifluoroethylene), poly(vinylidene fluoride), and poly(dimethylsiloxane). The apparatus for this embodiment is depicted in FIG. 3, where similar components have been designated with the same reference numerals as in FIG. 2, the exception being that the former apparatus employs facers 23 and 24, while in the latter apparatus no facers, temporary or otherwise, are used. It is expected that periodically the belts would be recoated for maximum performance in localized areas. Shortly after the sheets have been removed, the product is cut to length to produce the boards 10. Such cutting is within the skill of the art, including flying cut-off saws and the like, which provide desired dimensions without interruption of the apparatus 20. While lengths can be varied at will on such apparatus, the widths of the boards 10 can subsequently be trimmed to size in a separate operation, as necessary.

Figure 4:
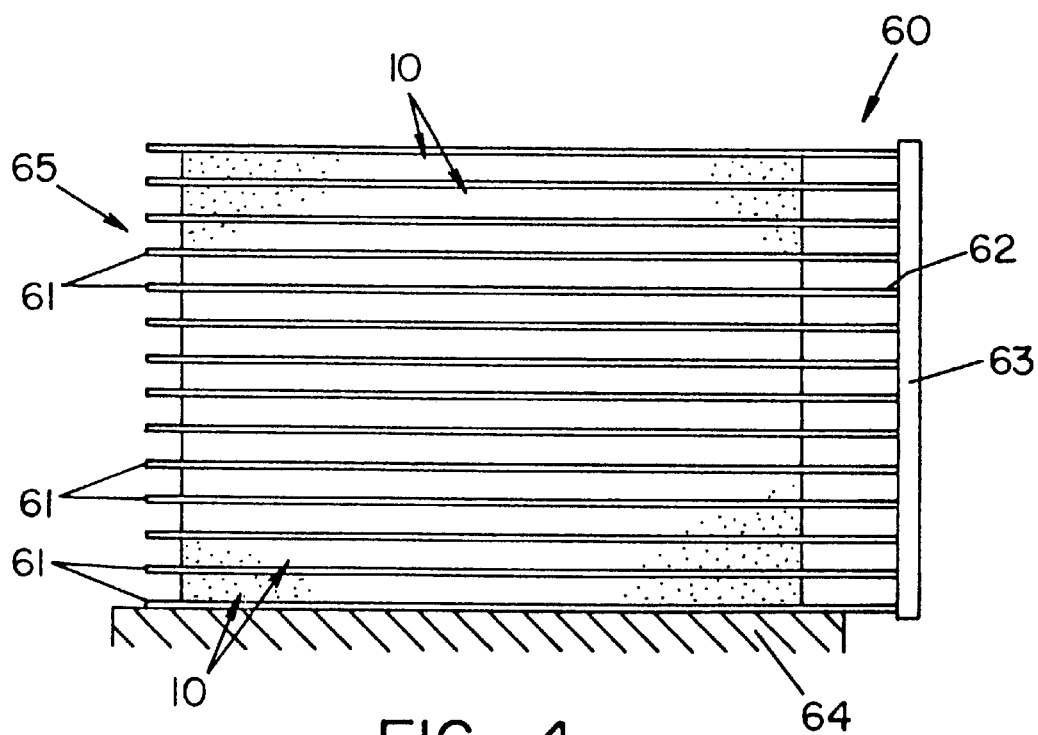
FIG. 4 is a side elevation of apparatus employed to separate recently manufactured insulation boards during the final stage of curing and cooling, depicting a plurality of stacked insulation boards.

After the newly formed, facerless boards 10 have been cut, they are removed from the apparatus 20, via suitable conveying means (not shown) and stacked for further curing where they develop increased dimensional stability, become no longer reactive and cool to near room temperature. With reference to FIG. 4, there is depicted a separator assembly, indicated generally by the numeral 60. Separator 60 comprises a plurality of flexible arms 61, which are held at one end 62 by a frame member 63. The lowermost arm is rested on the floor 64, or other suitable flat support structure, for receipt of a first insulation board 10. This board is covered by the next flexible arm 61 of the assembly 60, followed by another board 10, and so forth, until a bundle of boards, generally 65, is formed, typically about four feet high. By next flexible arm, it is meant the adjacent arm that is above the newly placed board.

Once stored in this bundle 65, the boards will generate heat up to about 150° C. over the several days needed to complete curing and after this time, they have developed their maximum dimensional stability. Generally however, the boards 10 remain in the bundle 65 for approximately one week following which, the frame 63 is pulled away, removing the arms 61, to provide a stack of facerless boards ready for shipment to a job site, or storage, or for subsequent shipment.

In order to insure that the newly formed boards do not stick together or to the separator assembly 60, the arms are manufactured from a flexible material that will not bond or otherwise adhere to the boards. Accordingly, the arms are preferably made from a high strength, reinforced paper, appropriately treated with a release agent, such as Teflon, poly(chlorotrifluoroethylene), fluorinated poly(ethylene-co-propylene)-FEP resin or isotactic polypropylene. It will be appreciated nevertheless, that the assembly is not limited only to arms of such material and those skilled in the art can readily select alternative materials, so long as they do not adhere or bond to the newly formed insulation boards.

EXAMPLES

In order to demonstrate the practice of the present invention a facerless board was produced on a commercial laminator. The films used for both the top and bottom recoverable films were 3 mil thick and comprised a blend of high density polyethylene and linear low density polyethylene. These films are sold under the tradename Winflex 10. The material was 48.25 inches wide. The restrain rise laminator was set up for a two inch thick product. The formulation of the board is set forth in Table I.

TABLE I

Facerless Board Composition

| | PARTS BY WEIGHT |
|---|---|
| Polyester Polyol, Terate 2541 | 100.00 |
| HCFC-141b | 22.50 |
| HCFC-22 | 3.00 |
| Water | 0.50 |
| Silicone Surfactant, Pelron 9797 | 1.25 |
| Potassium Octoate, OMG 977 | 2.90 |
| Pentamethyldiethylenetriamine, Air Products Polycat 5 | 0.52 |
| Polymeric Diphenylmethane Diisocyanate | 168.20 |

As the recoverable films and foam exited the laminator, the film and foam board were separated without difficulty. The films were successfully reused twice with the observation that the bottom film would begin to stick more quickly than the upper film.

The boards shrunk approximately 0.5 inches on all sides within three minutes of exiting the laminator. After this initial shrinkage, however, no further shrinkage was observed. The major faces of the board (8'×4'×2") had a smooth marble-like appearance.

Various physical tests were performed on the above board whose composition is displayed in Table I. The tests, as well as the results thereof are displayed in Table II below.

TABLE II

Physical Properties

| Physical Property | RESULTS |
|---|---|
| Core density, pcf | 1.90 |
| Board density, pcf | 2.11 |
| R-Value, 7.5 months | 5.9/in |
| Cold age dimensional stability at −40° F. after 7 days, vol % | 0.2 |
| Humid age dimensional stability at 70° C./97% relative humidity after 7 days, vol % | 1.15 |
| Flexural strength, psi (machine direction, ASTM C-203) | 52.4 |
| Water absorption, % volume, ASTM C-209 | 0.056 |
| Compressive strength, psi | 31.6 |

The need for a separator was demonstrated when approximately twelve boards (8'×4'×2") were stacked in a bundle within one minute of exiting the laminator. Within two minutes, the boards began to demonstrate tackiness, and after five minutes, it was difficult to separate the boards without breaking them. After thirty minutes, the twelve boards essentially fused together into one solid piece of foam. A major contributing factor to the boards sticking together is that the temperature in the middle of the bundle can easily reach 140° C., and that coupled with the small amount of unreacted isocyanurate, which is intertwined within the polymer network, cements the faces of each board together.

Thus it should be evident that the device and methods of the present invention are highly effective in providing facerless insulation boards useful for roofing operations. The invention is particularly suited for new roofing, but is not necessarily limited thereto. The method of the present invention for manufacturing can be practiced with other equipment and, the method for covering roofs can be practiced with the variety of boards 10 that fall within the scope of the present invention.

Based upon the foregoing disclosure, it should now be apparent that the use of the facerless insulation boards described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, boards according to the present invention are not necessarily limited to those having a isocyanurate or polyurethane foam core. Moreover, as noted hereinabove, the composition of the temporary facer sheets can be varied, as is true for the arms selected for the separator assembly. Thus, the scope of the invention shall include all modifications and variations that may fall within the scope of the attached claims.

What is claimed is:

1. A continuous method of making a facerless insulation board comprising the steps of:

feeding a first sheet of temporary facer material into a laminator;

depositing a foamable polymer liquid onto the first sheet;

feeding a second sheet of temporary facer material into said laminator above the foamable polymer liquid;

allowing the polymer liquid to rise between the first and second sheets forming polymer foam of a predetermined thickness;

curing the polymer foam under heat to create the insulation board;

removing the first and second sheets from the board prior to final curing and cooling;

cutting the board to desired lengths; and stacking a plurality of said boards in a separator assembly for additional curing and subsequent stacking; wherein said separator assembly comprises a plurality of arm members attached at one end to a frame member, and wherein said step of stacking includes placing a first board onto one of said arms;

positioning a subsequent arm over said first board;

repeating said steps of placing and positioning to form a bundle of said boards within said separator assembly; and storing said boards in said bundle for a period of time sufficient to allow said boards to become dimensionally stable.

2. A continuous method of making a facerless insulation board, as set forth in claim 1, wherein the first and second sheet of temporary facer material comprise high density polyethylene having a thickness in the range from about 0.6 mil to about 200 mil.

3. A continuous method of making a facerless insulation board, as set forth in claim 1, wherein said step of curing the polymer foam under heat comprises passing the polymer foam through an oven.

4. A continuous method of making a facerless insulation board, as set forth in claim 1, wherein the foamable polymer liquid is selected from the group consisting of polyisocyanurate, polyurethane, and mixtures thereof.

5. A continuous method of making a facerless insulation board, as set forth in claim 4, wherein the foamable liquid comprises polyurethane, and wherein said step of depositing a foamable polymer liquid onto the first sheet comprises separately depositing isocyanate components and polyol components from separate sources.

6. A continuous method of making a facerless insulation board, as in claim 1, wherein the first and said second sheet of temporary facer material are the same or different and comprise polymeric materials selected from the group consisting of polyolefins, poly(tetrafluoroethylene), poly(vinylfluoride), poly(trifluoroethylene), poly(vinylidene fluoride), and poly(dimethylsiloxane).

7. A continuous method of making a facerless insulation board, as in claim 1, wherein the foamable polymer liquid is polyisocyanurate.

8. A continuous method of making facerless insulation board, as set forth in claim 1, wherein said plurality of arm members are flexible.

* * * * *